(12) United States Patent
Traw et al.

(10) Patent No.: US 6,542,610 B2
(45) Date of Patent: *Apr. 1, 2003

(54) CONTENT PROTECTION FOR DIGITAL TRANSMISSION SYSTEMS

(75) Inventors: Chandler Brendan Stanton Traw; David Wayne Aucsmith, both of Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,338

(22) Filed: Aug. 11, 1997

(65) Prior Publication Data

US 2002/0007452 A1 Jan. 17, 2002

Related U.S. Application Data

(63) Continuation-in-part of application No. 08/791,245, filed on Jan. 30, 1997, now Pat. No. 5,949,877.

(51) Int. Cl.$^7$ ............................. H04L 9/12; H04L 9/16
(52) U.S. Cl. ..................... 380/262; 380/260; 380/264; 713/168; 713/169
(58) Field of Search ................ 380/4, 28, 49, 380/201, 264, 268, 271, 286, 260, 262; 713/1, 100, 150, 151, 168, 169, 189, 156

(56) References Cited

U.S. PATENT DOCUMENTS

| | | | | |
|---|---|---|---|---|
| 4,937,866 A | * | 6/1990 | Crowther et al. | 380/20 |
| 5,241,598 A | * | 8/1993 | Raith | 380/21 |
| 5,473,692 A | | 12/1995 | Davis | 380/25 |
| 5,539,828 A | | 7/1996 | Davis | 380/50 |
| 5,568,552 A | | 10/1996 | Davis | 380/4 |
| 5,621,798 A | | 4/1997 | Aucsmith | 380/25 |
| 5,701,464 A | | 12/1997 | Aucsmith | 395/610 |
| 5,712,914 A | | 1/1998 | Aucsmith et al. | 380/30 |
| 5,751,809 A | | 5/1998 | Davis et al. | 380/23 |
| 5,757,919 A | | 5/1998 | Herbert et al. | 380/25 |
| 5,796,840 A | | 8/1998 | Davis | 380/50 |
| 5,805,700 A | | 9/1998 | Nardone et al. | 380/10 |
| 5,805,706 A | | 9/1998 | Davis | 380/49 |
| 5,805,712 A | | 9/1998 | Davis | 380/50 |
| 5,818,939 A | | 10/1998 | Davis | 380/49 |
| 5,825,890 A | * | 10/1998 | Elgamal et al. | 380/49 |
| 5,828,753 A | | 10/1998 | Davis | 380/49 |
| 5,845,116 A | * | 12/1998 | Saito et al. | 395/673 |
| 5,878,144 A | | 3/1999 | Aucsmith et al. | 380/30 |
| 5,892,899 A | | 4/1999 | Aucsmith et al. | 395/186 |
| 5,907,619 A | | 5/1999 | Davis | 380/23 |
| 5,926,550 A | | 7/1999 | Davis | 380/25 |

(List continued on next page.)

Primary Examiner—Gail Hayes
Assistant Examiner—Justin T. Darrow
(74) Attorney, Agent, or Firm—Blakely, Sokoloff, Taylor & Zafman LLP

(57) ABSTRACT

A method for protecting digital content from copying and/or other misuse as it is transferred between one or more computationally constrained devices over insecure links, includes preliminarily authenticating that both a content source and a content sink are compliant devices, and transferring content between compliant devices. In a further aspect of the invention, in the background, concurrently with the transfer of content, at least a second cryptographic process is performed.

In an embodiment, establishing a preliminary control channel includes exchanging random challenges between devices, encrypting, under a shared secret key, and hashing the exchanged random challenges, exchanging the results of the encryption and hash functions and then verifying that the appropriate results have been generated.

40 Claims, 9 Drawing Sheets

U.S. PATENT DOCUMENTS

| | | | |
|---|---|---|---|
| 5,949,877 A | 9/1999 | Traw et al. | 380/4 |
| 5,949,881 A | 9/1999 | Davis | 380/25 |
| 5,970,147 A | 10/1999 | Davis | 380/25 |
| 6,021,201 A | 2/2000 | Bakhle et al. | 380/25 |
| 6,023,509 A | 2/2000 | Herbert et al. | 380/25 |
| 6,058,478 A | 5/2000 | Davis | 713/191 |
| 6,088,450 A | 7/2000 | Davis et al. | 380/25 |
| 6,115,816 A | 9/2000 | Davis | 713/153 |
| 6,175,626 B1 | 1/2001 | Aucsmith et al. | 380/30 |
| 6,175,925 B1 | 1/2001 | Nardone et al. | 713/200 |
| 6,178,509 B1 | 1/2001 | Nardone et al. | 713/200 |
| 6,181,803 B1 | 1/2001 | Davis | 382/115 |
| 6,185,546 B1 | 2/2001 | Davis | 705/51 |
| 6,199,053 B1 | 3/2001 | Herbert et al. | 705/76 |
| 6,205,550 B1 | 3/2001 | Nardone et al. | 713/200 |
| 6,209,098 B1 | 3/2001 | Davis | 713/194 |
| 6,219,423 B1 | 4/2001 | Davis | 380/268 |
| 6,292,892 B1 | 9/2001 | Davis | 713/156 |

* cited by examiner

CONTENT PROTECTION FOR DIGITAL TRANSMISSION SYSTEMS

CROSS REFERENCE TO RELATED APPLICATIONS

This is a continuation-in-part of application Ser. No. 08/791,245, now U.S. Pat. No. 5,949,877 filed Jan. 30, 1997.

FIELD OF THE INVENTION

The present invention relates generally to digital content protection and more particularly to scaleable methods and apparatus for secure communication between content sources and content sinks when either or both are computationally constrained.

BACKGROUND

Computer capabilities have increased dramatically in recent years. In addition to traditional computer applications such as word processing and spreadsheet calculations, modern personal computers (PCs) are typically capable of producing and playing multimedia presentations.

Multimedia applications may include materials such as audio, video or graphic elements that are subject to copyright or contractual restrictions as to use, distribution or the like. Typically, the multimedia content is provided in digital form for use by computers or other digital consumer electronic (CE) devices.

Many content providers are reluctant to include valuable copyrighted material, e.g., full length motion pictures, for use in multimedia applications because the digital bitstream may be intercepted and copied. Unlike analog materials which degrade in quality from one copy generation to the next, digital copying is capable of producing perfect copies regardless of how many generations of copies are produced.

Recent advances in storage technology, particularly digital video discs (DVD) have created the ability to store full length motion pictures on a single small disc. However, consumers are unlikely to benefit from such advances unless content providers have a mechanism to distribute digitized versions of their valuable copyrighted material in a manner that largely eliminates unauthorized copying.

It is possible to devise strong content protection schemes for securely transferring digital content between various devices. These schemes are often computationally intensive, although modern PCs and customized hardware implementations, typically have sufficient computational resources to perform these content protection schemes in a substantially real-time manner. However, in order to meet manufacturing cost targets, CE devices are often not equipped with the computational resources needed to implement strong content protection schemes in a substantially real-time manner.

What is needed is a method and apparatus for protecting digital content from copying and/or other misuse as it is transferred between one or more computationally constrained devices over insecure communication links.

SUMMARY OF THE INVENTION

Briefly, a method of transferring content between one or more computationally constrained devices over insecure links, includes preliminarily authenticating that both a content source and a content sink are compliant devices, transferring content between compliant devices, then, in the background, concurrently with the transfer of content, perform at least a second cryptographic process.

In an embodiment, establishing a preliminary control channel includes exchanging random challenges between devices, encrypting, under a shared secret key, and hashing the exchanged random challenges, exchanging the results of the encryption and hash functions and then verifying that the appropriate results have been generated.

Other features and advantages of the present invention will be apparent from the drawing figures, and detailed description that follow.

DETAILED DESCRIPTION

Figure 1A:
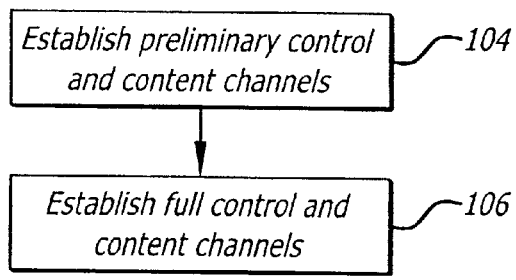
FIGS. 1(a)–(b) are flow diagrams showing embodiments of an authentication process in accordance with the present invention.

Various aspects of the present invention are described below. However, it will be understood by those skilled in the art that the present invention may be practiced with only some or all aspects of the present invention. For purposes of explanation, specific numbers, materials and configurations are set forth in order to provide a thorough understanding of the present invention. It will also be apparent to those skilled in the art that the present invention may be practiced without these specific details.

Some portions of the detailed descriptions which follow are presented in terms of algorithms and symbolic representations of operations on data bits within a computer or other information processing system. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (e.g., electrical) quantities within the computer system's registers and memories into other data similarly represented as physical quantities within the computer system memories or registers or other such information storage, transmission or display devices.

Terminology

Baseline Cipher refers to a cipher algorithm that is common to all compliant devices. Examples of some well-known algorithms that may be used are Blowfish, DES and RC-4.

Blowfish refers to a block cipher that can be implemented very efficiently in software on PCs. It is described in, "Description of a New Variable Length Key, 64-Bit Block Cipher (Blowfish)," by B. Schneier, Fast Software Encryption, Cambridge Security Workshop Proceedings, Springer-Verlag, 1994, pp. 191–204.

Compliant device refers to a device which is capable of securely transferring content in accordance with the present invention. Typically, the compliant device should have a digital certificate signed by a license authority, implement anti-tampering measures to reduce the likelihood that details about the private key and/or authentication and key exchange mechanisms are readily discernible or alterable, and should avoid transferring protected content unless all devices participating in the content transfer have been authenticated.

CGMS refers to Copy Generation Management System, a well-known format for indicating copy protection status.

Computationally constrained, as used herein, refers to devices that do not have sufficient computational resources to perform the processes needed to authenticate compliant devices and establish secure control and content channels rapidly enough such that protected content can be delivered to a user within an acceptable latency period. The acceptable length of the latency period varies between individual users, however, substantially real-time operation is generally considered a desirable goal.

Device, as used herein, refers to both traditional consumer electronics products including but not limited to DVD player/recorders, digital televisions, set top boxes, digital satellite services receivers, and similar products, as well as applications running on one or more computers.

DES refers to the Data Encryption Standard a popular, symmetric key, standard encryption algorithm. It is a product cipher that operates on 64 bit blocks of data, using a 56 bit key. It is defined in FIPS 46-1 (1988) (which supersedes FIPS 46 (1977)). DES is identical to the ANSI standard Data Encryption Algorithm (DEA) defined in ANSI X3.92-1981.

DSA refers to the Digital Signature Algorithm specified in the DSS.

DSS refers to the Digital Signature Standard specified in FIPS 186 Digital Signature Standard, May 19, 1994, and available from NTIS.

FIPS refers to Federal Information Processing Standards, which are United States Government technical standards published by the National Institute of Standards and Technology. Computer-related products bought by the US Government must conform to these standards.

IEEE 1394 refers to IEEE Standard for a High Performance Serial Bus, IEEE Std 1394-1995, Institute of Electrical and Electronic Engineers, August 30, 1995.

ISO refers to the International Organization for Standardization, a voluntary, organization, responsible for creating international standards in many areas, including computers and communications.

MPEG is an acronym for Moving Picture Experts Group, and refers to an ISO committee that generates standards for digital video and audio compression. MPEG also refers to the name of algorithms promulgated by the MPEG committee. MPEG-1 is optimized for CD-ROM, MPEG-2 for broadcast quality video and MPEG-4 for low bandwidth video telephony.

Public key refers to ciphers that use different keys for encrypting and decrypting a particular unit of data.

Symmetric key refer to ciphers that use the same key for encrypting and decrypting a particular unit of data.

Overview

Embodiments of the present invention provide the ability to communicate (that is, transfer, transmit, distribute, or the like), protected content between devices over otherwise insecure communication links, at varying levels of security. In particular, a first level of security is selected that can be established quickly by computationally constrained devices. Protected content can then be transferred between devices while a more secure channel is established in the background. In this way even low cost, computationally constrained devices can begin delivering content to a user with low latency. FIG. 1(a) illustrates a process embodying the present invention where in a step 104, preliminary control and content channels are established, and subsequently, in a step 106, full control and content channels are established.

Figure 1B:
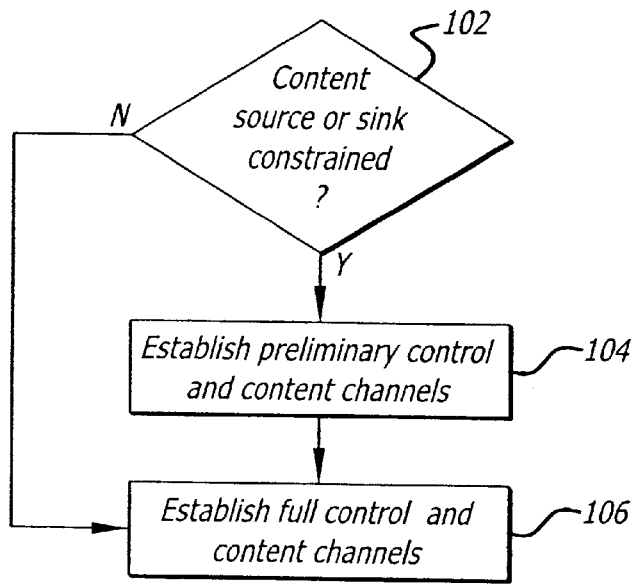

FIG. 1(b) illustrates an alternative embodiment which includes a step 102, wherein a determination is made as to whether the content source or sink is computationally constrained. If neither of the devices is computationally constrained then the step of establishing preliminary control and content channels is bypassed.

In embodiments of the present invention, when two (or more) compliant devices are to exchange protected content across a communications medium, such as an IEEE 1394 serial bus, the cryptographic protocols described herein are used to protect the content as it traverses the bus.

Before any protected content can be exchanged, the devices that are to exchange the content must first authenticate themselves if they have not previously done so. Authentication is required to ensure that all of the devices that will be handling the protected content are compliant. The device authentication and control channel establishment process has two phases, first a preliminary authentication, followed by a full authentication. The properties of the two authentication phases are summarized in the Table 1.

TABLE 1

| Authentication Phase | Robustness | Computation Time (PC) | Computation Time (CE Microcontroller) |
|---|---|---|---|
| Preliminary | Reasonable | less than a millisecond | milliseconds |
| Full | High | 10s of milliseconds | 10s of seconds |

Following the completion of the preliminary authentication phase, an encrypted control channel is established between the authenticated devices. This preliminary control channel is used to initiate the transfer of protected content across the bus via encrypted content channels. The transfer of content is subject to immediate cancellation if any security threats are detected as the second, highly robust full authentication phase continues in the background.

The choice of symmetric ciphers is flexible to allow a range of solutions providing varying levels of security, implementation complexity, expense, and performance. In order to ensure interoperability, all compliant devices and applications should support the Baseline Cipher. Device certificates typically contain a description of the ciphers that are supported by a device. In alternative embodiments, device certificates specify that the pair of devices being authenticated support variable key length ciphers. In such a case, a key length can be specified along with the type of cipher to be used.

One cipher which can be use as the Baseline cipher or as an alternate supported cipher for this system is Blowfish. Blowfish is a block cipher that performs key dependent permutation and substitution operations on 64 bits of data at a time. In standard implementations of Blowfish, the permutation and substitution functions are derived from the hexadecimal digits of $\pi$ and the specific key being used to encrypt/decrypt data. This key can be up to 448 bits long. In this content protection system, Blowfish can be modified to allow the use of alternate initialization values for the permutation and substitution functions. Specifically, instead of $\pi$ other values can be used. These values may be randomly generated and stored in volatile or nonvolatile memory within a device. Alternatively, these values can be generated in real time or in advance and then distributed as initialization state prior to the use of the cipher.

Embodiments of the present invention do not complicate the use of CE devices or PC application software for legitimate users. All copy protection mechanisms happen transparently. When a new device is added to the system no special actions are required to renew device keys or otherwise enable the copy protection mechanisms. The authentication and key exchange mechanisms automatically handle the addition of new devices/applications and the establishment of channels between devices.

Figure 2:
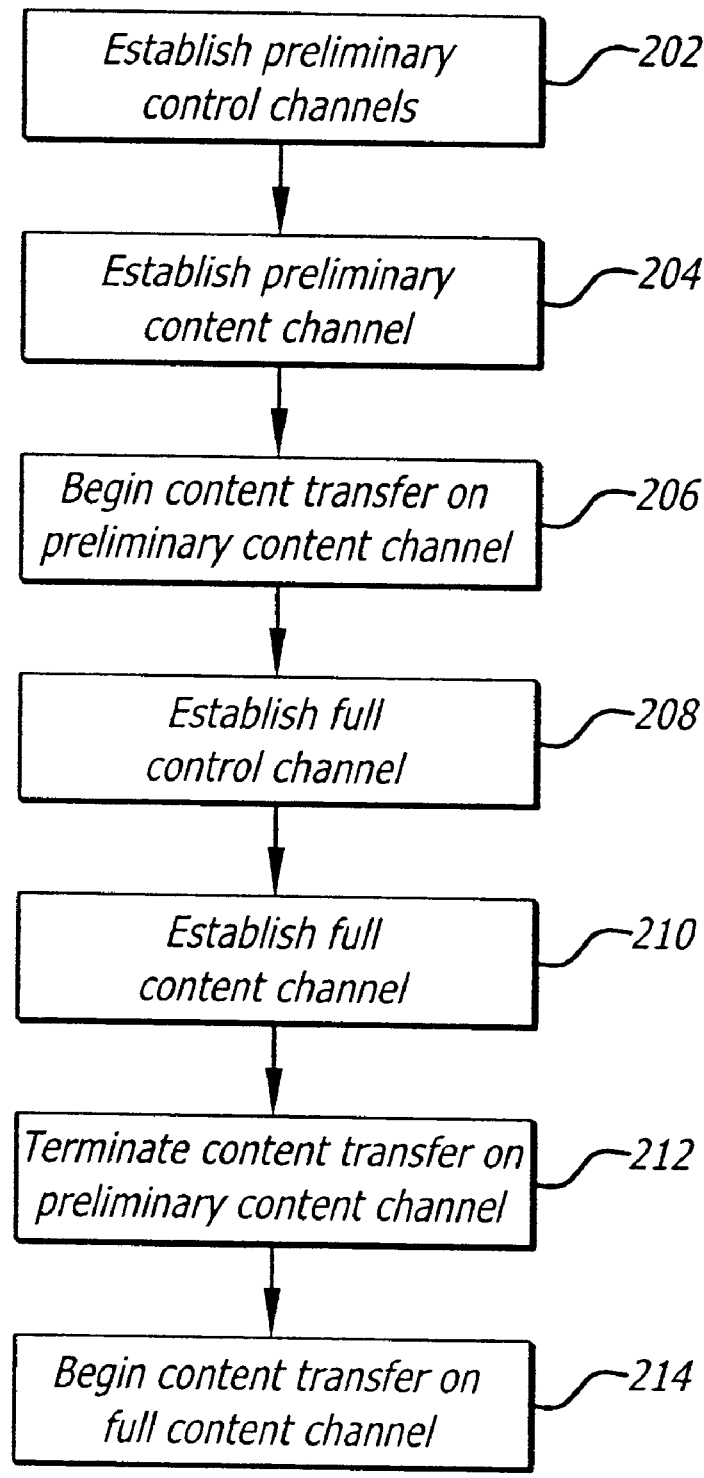
FIG. 2 is a flow diagram showing an embodiment of an authentication process in accordance with the present invention.

Referring to FIG. 2, a more detailed embodiment of the present invention is illustrated. In a step 202 a preliminary control channel is established. In a step 204, a preliminary content channel is established. In a step 206, content transfer over the preliminary content channel is begun. In a step 208, a full control channel is established in the background. In a step 210, a full content channel is established. In steps 212, 214, the content transfer over the preliminary content channel is terminated and content transfer over the full content channel is begun.

Embodiments of the present invention may be implemented in hardware, or software executed by a computing device such as a microcontroller or microprocessor. Well understood cost and performance trade-offs will guide designers in making specific implementation choices. Typically, for CE devices, the authentication and key exchange mechanisms should be implemented using software running on an embedded microcontroller, and the channel ciphers should be implemented in hardware. Typically, for a PC, all components of the content protection system in accordance with the present invention may be implemented in software. Preferably a PC that implements the present invention is protected by anti-tampering techniques.

Embodiments of the present invention are compatible with other copy management technology such as watermarking. For example, the copy control information can be embedded within the content using watermarks.

The following notation is used to describe the cryptographic processes of establishing both preliminary and full, control and content channels, as well as authentication processes.

General
$S^{X^{-1}}[M]$=Sign M using DSS with private key $X^{-1}$
$V^{X^1}[M]$=Verify signature of M using DSS with public key $X^1$
$E[K, M]$=Encrypt M with key K using baseline cipher
$H_{SHA-1}[M]$=Add SHA-1 hash to M
$|$=Concatenation of fields
Digital Transmission Protection Authority
$L^1$, $L^{-1}$=Digital Transmission Protection Authority DSS public/private key pair
g=public constant for Diffie-Hellman key exchange
$n_{full}$=public prime modulus for full authentication Diffie-Hellman key exchange
$S_u$=Universal shared secret for Preliminary Authentication and key exchange
Values Shared by Devices
$K_{Control}$=Control Channel key generated through Diffie-Hellman key exchanges
$K_{Content}$=Random Content Channel key
Control_Algo_Select=Selected symmetric cipher algorithm for a control channel
Content_Algo_Select=Selected symmetric cipher algorithm for a content channel
For Device X
$X^1$, $K^{-1}$=DSS Public/private key pair
$X_{ID}$=Identification Number
$X_{Hash}$=SHA-1 hash of software implementation
$X_{Auth\_Mask}$=Authorization Mask
$X_{Cert}=X_{ID}|X_{Hash}|X_{Auth\_Mask}|X^1|S^{L^{-1}}[X_{ID}|X_{Hash}|X_{Auth\_Mask}|X^1]$=Device Certificate
Xk=Random value for the first phase of the Diffie-Hellman key exchange
Preliminary Authentication In a typical embodiment of the present invention, authentication and control messages are sent using IEEE 1394 asynchronous transactions. However, other interconnect technologies such a Ethernet, or cable television plants may be used. The only requirement is that the interconnect technology must support bi-directional communication.

In an example of system operation in accordance with the present invention, a compliant device ("Device A") which is a source of protected content (e.g., a DVD player) is requested to transmit protected content across a serial bus to another compliant device ("Device B") which is a sink for protected content (e.g., a PC running an MPEG-2 video stream decoder).

When Device A is requested to initiate the transmission of protected content to Device B, Device A checks to see if an encrypted control channel has already been established between the two devices. If this control channel exists, the devices have already authenticated each other making further authentication unnecessary, and the devices can immediately establish an encrypted content channel. If however, the control channel does not exist, preliminary authentication must be initiated.

The preliminary authentication phase is designed to provide reasonable security for protected content while being computationally lightweight in order to maintain user transparency. The preliminary authentication phase typically requires a fraction of a second of computation to complete on a typical CE embedded controller.

In an alternative embodiment, a determination is made regarding the computational capacity of the current source and sink. If both the content source and sink have the computational resources to provide full authentication and channel establishment quickly enough to be transparent to a user, then, as shown in FIG. 1(b), the preliminary authentication phase is bypassed. Typically, when authentication is performed between two PCs, the preliminary authentication phase is bypassed since sufficient computational resources exist to perform the full authentication procedure in a user transparent manner.

In an illustrative embodiment of the present invention, the devices exchange challenges, perhaps random challenges ($A_C$, $B_C$) and device certificates ($A_{Cert}$, $B_{Cert}$). Both devices respond by encrypting (with key $S_U$) and then hashing the other device's challenge. Upon receiving the response to the challenge, each device verifies that the appropriate response has been received. If the expected value is not returned, a security threat has been detected and the system will not be permitted to exchange protected content. If the random challenge is successful, a shared control channel key ($K_{Pre\_Control}$) is computed by the devices.

Figure 3A:
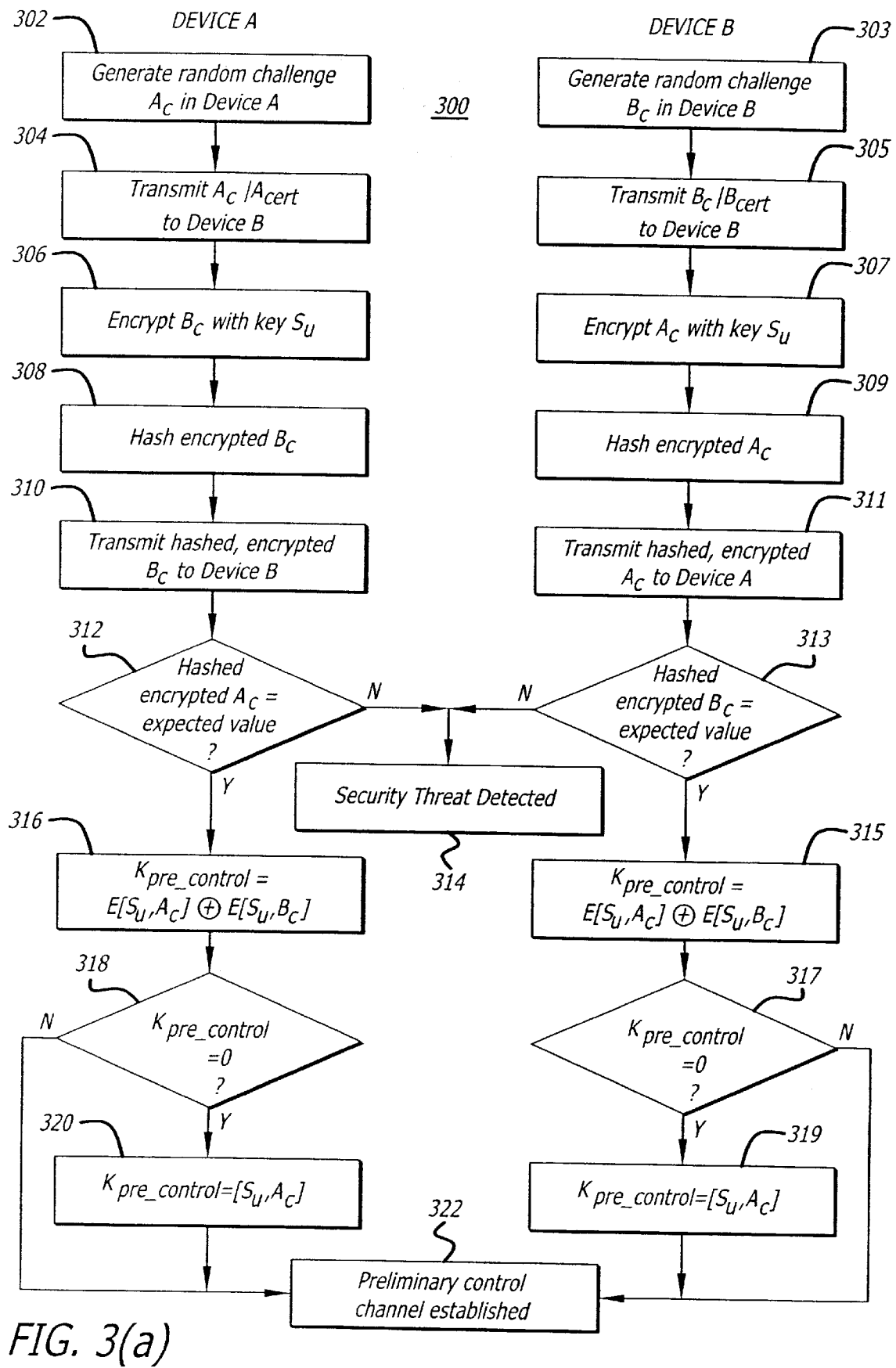
FIGS. 3(a)–(b) are flow diagrams showing an authentication and preliminary control channel key generation in accordance with the present invention.
Figure 3B:
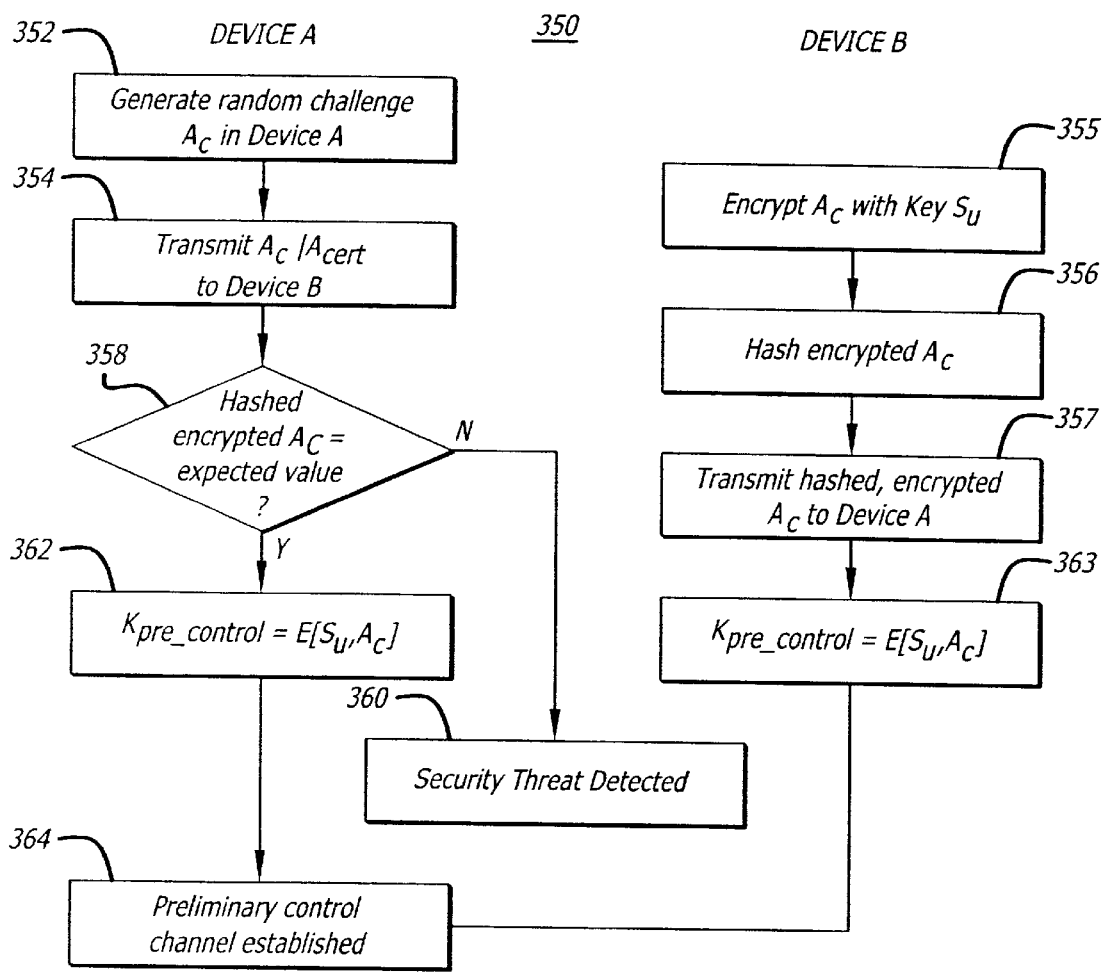

FIG. 3($a$) illustrates details of an illustrative embodiment of the preliminary authentication process in accordance with the present invention. Device A generates a random challenge 302, concatenates the random challenge with the certificate of Device A to form a data string ($M_{A1}$). and transmits 304 $M_{A1}$ to Device B. Similarly, Device B generates a random challenge 303, concatenates the random challenge with the certificate of Device B to form a data string ($M_{B1}$) and transmits 305 $M_{B1}$ to Device A.

Device A encrypts 306 the random challenge received from Device B. This encryption is performed with the Baseline cipher using the shared secret key $S_U$. The result of this encryption is then hashed 308 to form a data string ($M_{A2}$). Device B encrypts 307 the random challenge received from Device A. This encryption is performed with the Baseline cipher using the shared secret key $S_U$. The result of this encryption is then hashed 309 to form a data string ($M_{B2}$).

Data string $M_{A2}$ is transmitted 310 to Device B where it is compared 313 to the expected value. Similarly, data string $M_{B2}$ is transmitted 311 to Device A where it is compared 312 to the expected value. If both $M_{A2}$ and $M_{B2}$ match the expected values, then a preliminary control channel key is generated 315, 316 in both Device A and Device B. If either $M_{A2}$ or $M_{B2}$ does not match its expected value, then Device A and Device B cannot exchange protected content 314.

Both Device A and Device B generate the preliminary control channel key by encrypting the random challenge of Device A and the random challenge of Device B, using the Baseline Cipher and the secret shared key $S_U$, then performing an exclusive OR operation between the two encrypted random challenges 315, 316. This can be described symbolically as Kpre_control=$E[S_U,A_c] \oplus E[S_U,B_c]$.

In a further embodiment of the present invention, if the random challenge generated by Device A and the random challenge generated by Device B are equal, then the preliminary control channel key is set to $E[S_U,A_c]$ 319, 320.

With the successful generation of a preliminary control channel key a preliminary control channel is established 322.

In the case where Device A is a content source and Device B is only a content sink and can never be a content source, then the preliminary authentication procedure can simplified. More particularly, as shown in FIG. 3($b$), Device A generates a random challenge 362, concatenates the random challenge with the certificate of Device A to form a data string ($M_{A1}$). and transmits 354 $M_{A1}$ to Device B.

Device B encrypts 355 the random challenge received from Device A. This encryption is performed with the Baseline cipher using the shared secret key $S_U$. The result of this encryption is then hashed 356 to form a data string ($M_{B2}$).

Data string $M_{B2}$ is transmitted 357 to Device A where it is compared 358 to the expected value. If $M_{B2}$ matches the expected value, then a preliminary control channel key is generated 362, 363 in both Device A and Device B. If $M_{B2}$ does not match its expected value, then Device A and Device B cannot exchange protected content 360.

Both Device A and Device B generate the preliminary control channel key by encrypting the random challenge of Device A using the Baseline Cipher and the secret shared key $S_U$ 362, 363. This can be described symbolically as Kpre_control=$E[S_U,A_c]$.

To maintain the validity of this authentication mechanism, $S_U$ must not be made public and must be protected from disclosure through reverse engineering.

Typically, the baseline channel cipher, which is supported by all devices, will be used for this preliminary control channel.

In a further embodiment of the present invention, the exchanged device certificates can provide property information about the devices being authenticated. For example, one property is the level of authentication supported for a given system. Full authentication is one option, however other conditional access mechanisms could be used as well.

In an alternative embodiment of the present invention, the initial exchange between Device A and Device B (shown at 304 and 305 in FIG. 3($a$)) is modified such that the certificates are not concatenated, or transmitted with the random challenges.

Full Authentication and Control Channel Key Exchange

If required, as soon as the preliminary authentication process is successfully completed, an attempt to perform a full authentication is begun.

Following the successful completion of the preliminary authentication procedure, each device calculates a Diffie-Hellman key exchange first phase value ($A_V$, $B_V$). The devices then exchange signed messages ($M_{A3}$ and $M_{B3}$) which contain: 1) the other device's random challenge from the preliminary authentication ($X_C$); and 2) the Diffie-Hellman key exchange first phase value ($X_V$).

An embodiment of the full authentication is illustrated with reference to FIG. 4($a$). Device A generates a message $M_{A3}$, and transmits the message to Device B as shown in steps 402, 404 and 406. Device B generates a message $M_{B3}$, and transmits the message to Device A (as shown at 403, 405 and 407). Device A and Device B then process the messages ($M_{B3}$, $M_{A3}$ respectively) which have been received by first checking the signature on the message by computing $V^{Y^1}[M_{Y3}]$ with the other device's (device Y's) public key ($Y^1$ from $Y_{Cert}$) to verify that the message has not been tampered with. Specifically, Device A determines whether $M_{B3}$ message signature is valid (408) and if not, then a security threat has been detected (410) and protected content cannot be exchanged. Similarly, Device B determines whether $M_{A3}$ message signature is valid (409) and if not, then a security threat has been detected (410) and protected content cannot be exchanged.

If the message signatures are valid, the next step is for Device A to verify Device B's certificate (412) by computing $V^{L^1}[B_{Cert}]$ and for Device B to verify Device A's certificate (413) by computing $V^{L^1}[A_{Cert}]$. If the Digital Transmission Protection Authority signature is not valid, the device that transmitted the certificate is not a compliant device.

If no errors, or security threats, have occurred up to this point, the two devices have authenticated each other (414, 415). In one embodiment of the present invention a "watch dog" timer is used to ensure that the full authentication procedure is completed in a timely manner. Those skilled in the art will recognize that a specific delay value, or range of values, can be determined according to the computational resources that are being.

By calculating $B_V^{AK}$ mod $n_{Full}$ (414) and $A_V^{Bk}$ mod $n_{Full}$ (415) for Devices A and B respectively, a new, more robust key, $K_{Control} = (g^{AkBk}$ mod $n_{Full})$, has been established for the encrypted control channel. To complete the full authentication procedure, Device A specifies (416) which channel encryption algorithm will be used to protect the Control Channel.

Embodiments of the present invention may compare $B_{Auth\_Mask}$ (found in $B_{Cert}$) with $A_{Auth\_Mask}$ to select the strongest encryption algorithm which is mutually supported. Control_Algo_Select is set to the appropriate value and transmitted to Device B. In still further embodiments of the present invention, a cipher initialization state is transmitted to Device B.

Figure 4A:
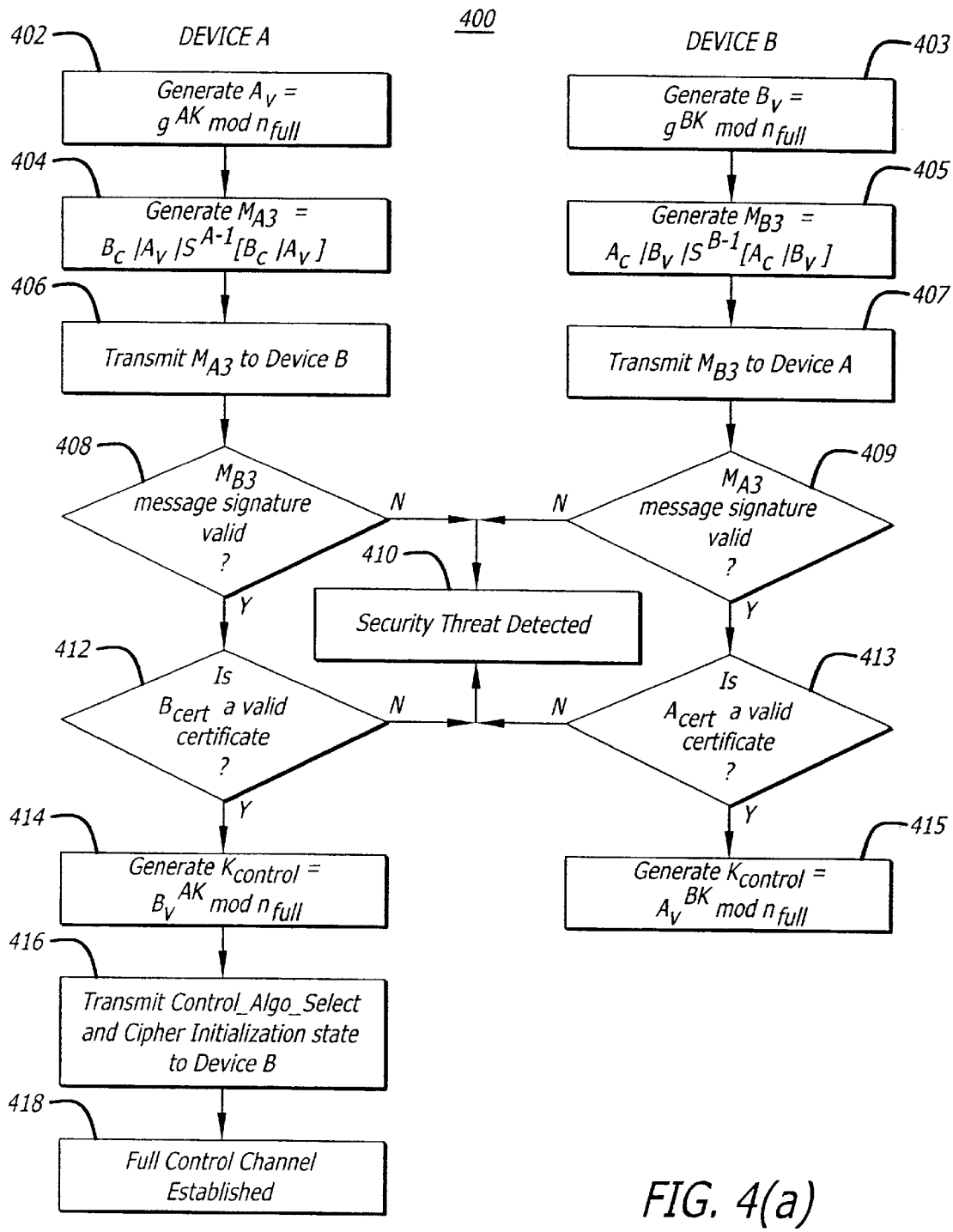
FIGS. 4(a)–(b) are flow diagrams showing an authentication process in accordance with the present invention.
Figure 4B:
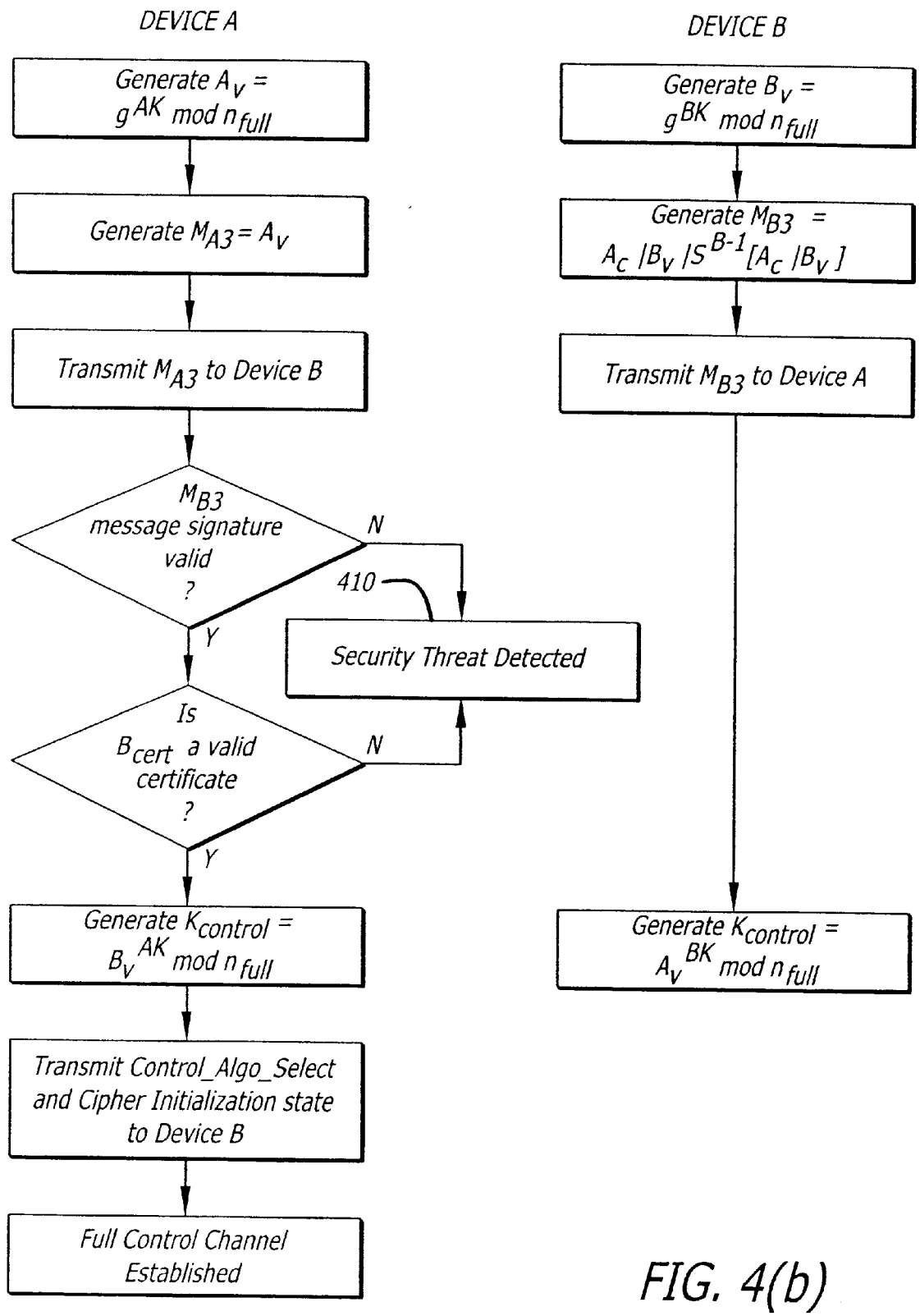

In the case where Device A is a content source and Device B is only a content sink and can never be a content source, then the full authentication procedure can simplified. More particularly, as shown in FIG. 4(b), where the determinations of Device A's message signature validity and Device A's certificate validity are obviated. Therefore the determinations (409, 413) shown in the embodiment of FIG. 4(a) are not required.

To switch over from the preliminary control channel key and baseline cipher to the new key and the cipher specified by Control_Algo_Select, a message is sent across the preliminary control channel indicating that all future control channel messages will use the new key and algorithm.

The control channel remains available as long as both devices remain powered up and attached to the communications link. The control channel can be repeatedly used to set up and manage the security of protected content streams without further authentication. Depending on the strength of the channel ciphers, it may be desirable to change the control channel keys on a regular basis. Control channel keys can be updated using a signed Diffie-Hellman key exchange similar to the one used during the full device authentication process. The computation for these key changes would typically be a low priority background activity, which would not affect overall device performance.

The algorithms for both DSS and Diffie-Hellman are public knowledge and have been subject to intensive efforts, unsuccessful thus far, to break them. From a technical perspective, the only things which must be kept secret for full authentication are the private keys for signing data. All other aspects of the system can be public. For greater security however, it is desirable to keep aspects of the system such as the symmetric cipher algorithm confidential.

Content Channel Encryption

Exemplary embodiments of the present invention, to establish an encrypted channel for protected content, can utilize the following procedure once a secure control channel has been established by the preliminary or full device authentication procedures. Encryption of the control channel is performed to preserve the confidentiality of content channel keys and ensure the integrity of other messages. The source of the content sends a message via the encrypted control channel to the compliant destination device (or devices in the case of a content multicast). This message contains: a randomly generated key which is unique for each stream of content. ($K_{Content}$); the symmetric cipher to use (Content_Algo_Select); Cipher initialization state; the Isochronous channel associated with the content stream; Copy Control Information (such as CGMS bits); a sequence number initialized to the least significant 16 bits of $A_C$ and incremented for each additional message sent. Alternative embodiments of the present invention can forgo the inclusion of message elements such as the Cipher initialization state or the sequence number initialized to the least significant 16 bits of $A_C$.

If additional compliant devices desire to receive content which is already being transmitted, they can request that the source device send the values described above via the appropriate control channel.

While content is flowing across an encrypted content channel, the copy control information associated with the stream can be updated at any time via the control channel(s) between the source device and destination device(s). Upon updating the copy control information, the key associated with the content channel should also be updated. In addition, depending on the strength of the channel ciphers, it may be desirable to change the content channel key on a periodic basis. New content channel keys and copy control information can be put into service when an indicator is transmitted over the content channel. This copy control information can be embedded in the content stream or as part of a header in the IEEE 1394 protocol, such as the CIP header.

When the source device has completed the transmission of the copyrighted content it sends a message to the destination(s) via the control channel(s) to terminate the content channel.

Most of the content which this system is intended to protect is real time in nature. Therefore, if the communications link used is the IEEE 1394 bus, then the protected content will typically be transferred across the IEEE 1394 serial bus isochronously. This system can also be used to protect non-real time content transferred asynchronously across a communications link.

Figure 5:
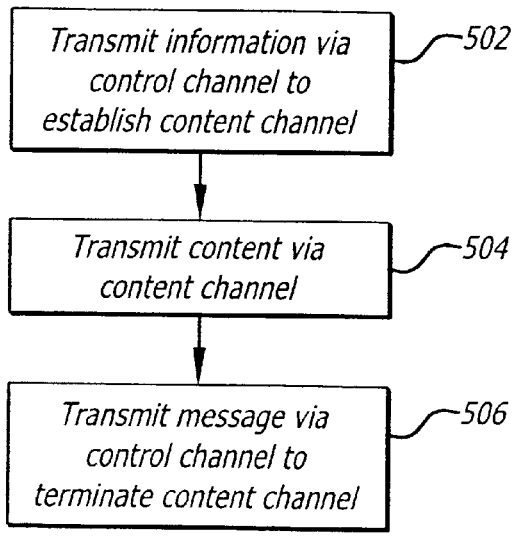
FIG. 5 is a flow diagram showing establishment of a content channel in accordance with the present invention.

FIG. 5 shows an example of the operation of an embodiment of the present invention. The source of the content, in a step 502, sends a message (as described above), via the previously established control channel, to a compliant destination device (or devices in the case of a content multicast).

If additional compliant devices desire to receive content which is already being transmitted, those devices can request receipt of the values described above via the control channel. A separate control channel is created between each source and destination.

The protected content is transmitted in a step 504. When the source has completed the transmission of the protected content it sends a message, in a step 506 to the destination(s) asynchronously via the control channel(s) which terminates the content channel.

Compliant System Components

Figure 6:
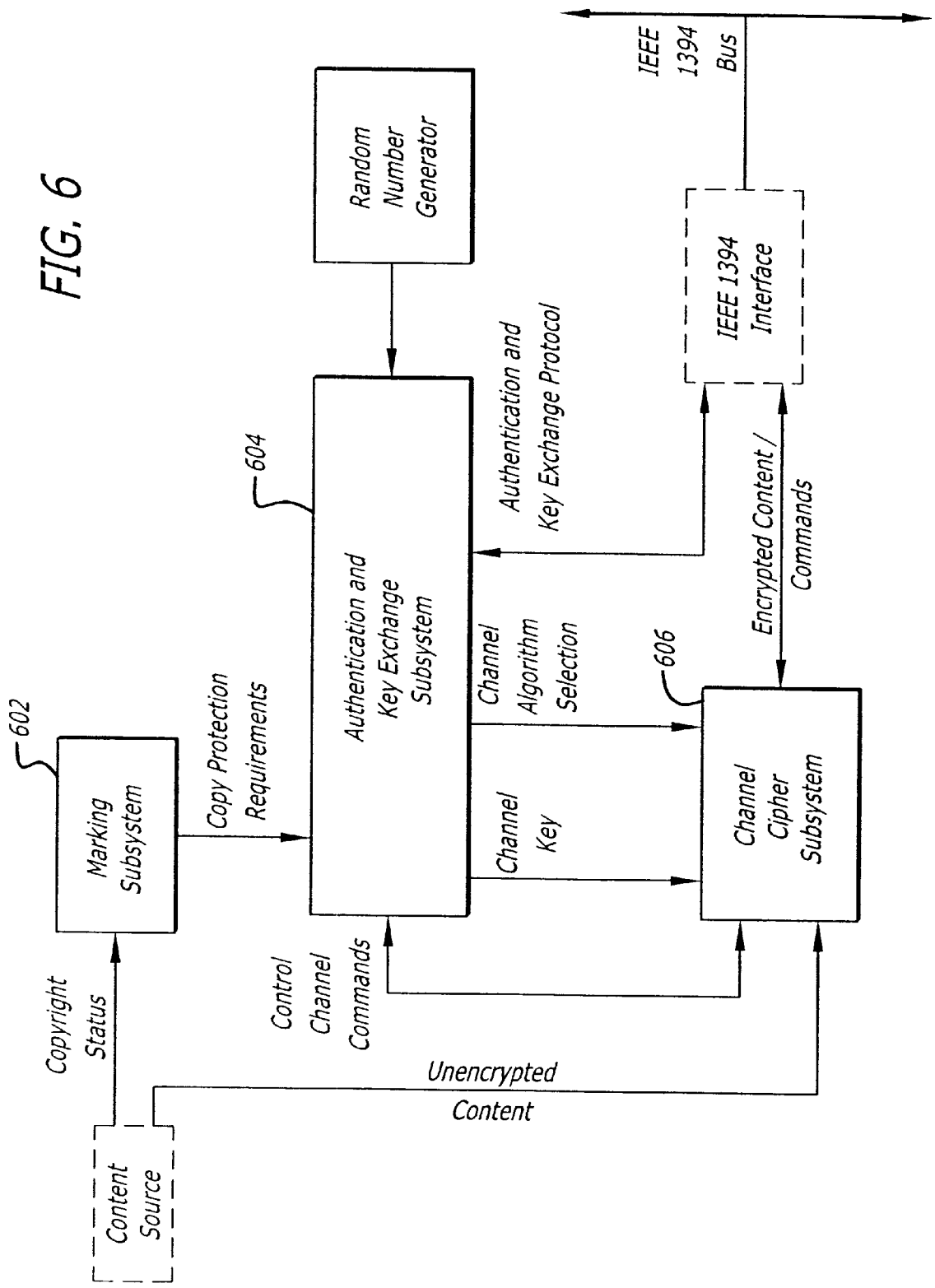
FIG. 6 is a block diagram showing a content source in accordance with the present invention.
Figure 7:
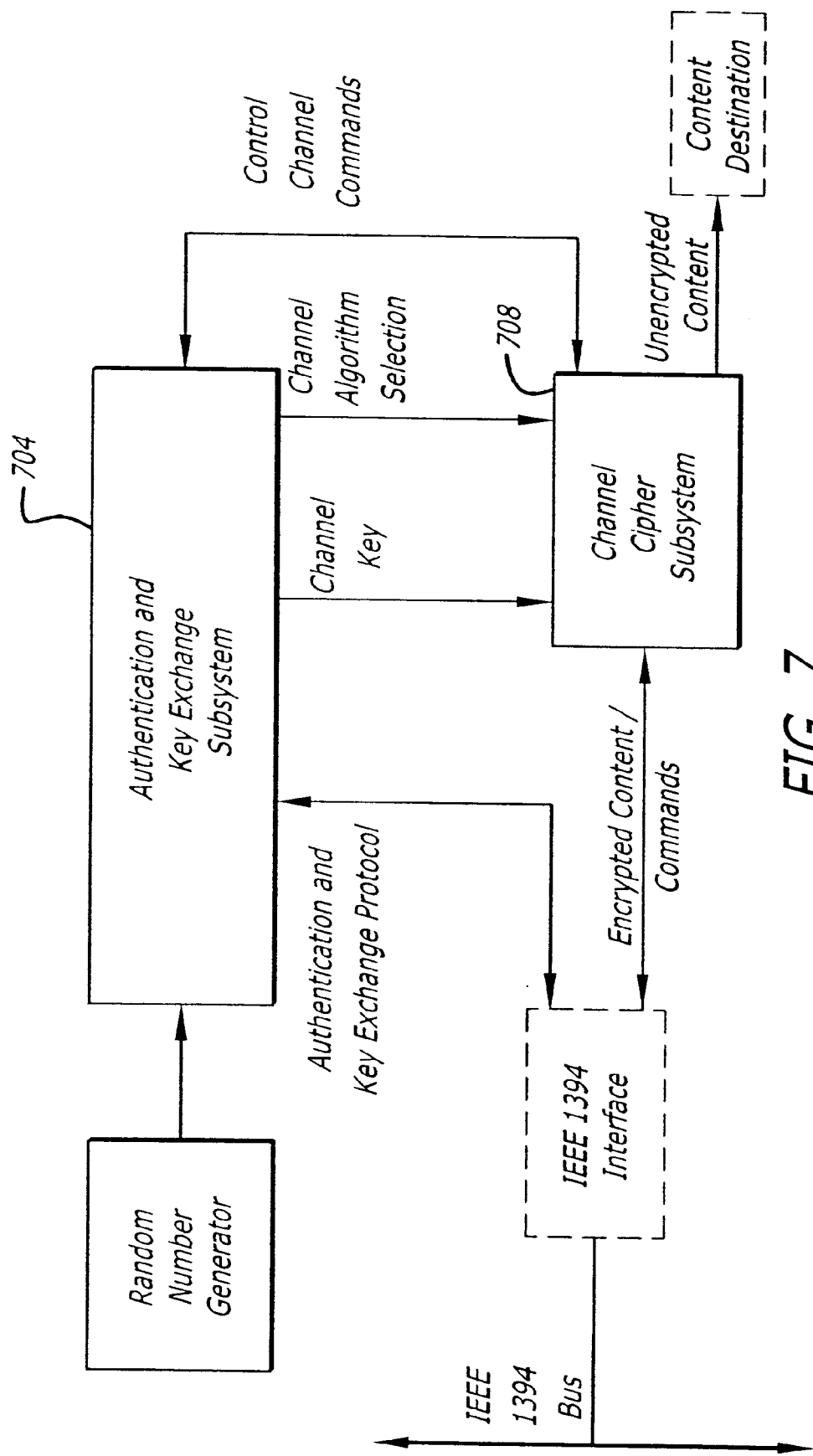
FIG. 7 is a block diagram showing a content sink in accordance with the present invention.

A compliant system must implement the components described in the following sections. FIG. 6 shows the components required for a device which is a source of protected content. FIG. 7 shows the components for a receiver of protected content. In both FIGS. 6 and 7, the subsystems in boxes with solid outlines are required for compliance. Boxes with dashed outlines are subsystems which are common to compliant and non-compliant devices.

Marking Subsystem

A Marking Subsystem 602 shown in FIG. 6 is present in systems which are sources of protected content. The primary function is to determine the protection status of the content which is to be transferred across the serial bus. This status is then translated into protection requirements which are passed to an Authentication and Key Exchange Subsystem 604.

Authentication and Key Exchange Subsystem

As shown in FIGS. 6 and 7 an Authentication and Key Exchange Subsystem 604, 704 is found in both Senders and Receivers of protected content. Authentication and Key Exchange Subsystem 604, 704 is responsible for implementing the protocols which are used to ensure that devices exchanging protected content are compliant. The protocol is also used to select a channel encryption algorithm and exchange the control channel encryption key.

Channel Encryption Subsystem

A compliant device that transmits protected content must have a Channel Encryption Subsystem 606. Control messages, as well as protected content, are encrypted prior to transmission. Channel Encryption Subsystem 606 performs these encryptions. The keys used to encrypt the content and commands are passed to Channel Encryption Subsystem 606 from Authentication and Key Exchange Subsystem 604. Channel Encryption Subsystem 606 may support more than one cipher, although for interoperability it is preferable that a Baseline Cipher be supported. In a typical embodiment of the present invention, Authentication and Key Exchange Subsystem 604 specifies the particular cipher and key to be used for each packet transmitted.

Channel Decryption Subsystem

A compliant device which receives protected content must have a Channel Decryption Subsystem 708. Channel Decryption Subsystem 708 decrypts control messages and protected content which are received from the serial bus. The keys used to decrypt the content and commands are passed to Channel Decryption Subsystem 708 from Authentication and Key Exchange Subsystem 704. Channel Decryption Subsystem 708 may support more than one cipher, although for interoperability it is preferable that a Baseline Cipher be supported. Authentication and Key Exchange Subsystem 704 specifies the particular cipher and key to be used for each packet received.

Baseline Cipher

A Baseline Cipher must be supported by Channel Encryption Subsystem 606 and Channel Decryption Subsystem 708 of all compliant devices. This baseline cipher is required to ensure the interoperability of all compliant devices. Additional ciphers with other properties such as increased security can also be deployed and used, provided that both the source and destination devices support it. Those skilled in the art will recognize that many symmetric key ciphers, for example DES, are available to for use as a baseline cipher.

Key Generation at Device Manufacture

Ideally, each device manufactured will have a unique device ID and public/private DSS key pair. With unique device IDs and DSS keys, the Digital Transmission Protection Authority will only need to revoke the certificates of the specific devices which have been compromised. Other users who bought the same device model and have not violated the license agreement would not be effected by this revocation. The principle drawback of this scheme may be that the manufacture of CE devices is made more complicated. This would be the case if no information unique to each copy of the device (such as a serial number) is currently programmed into it.

Authentication Software Infrastructure

Figure 8:
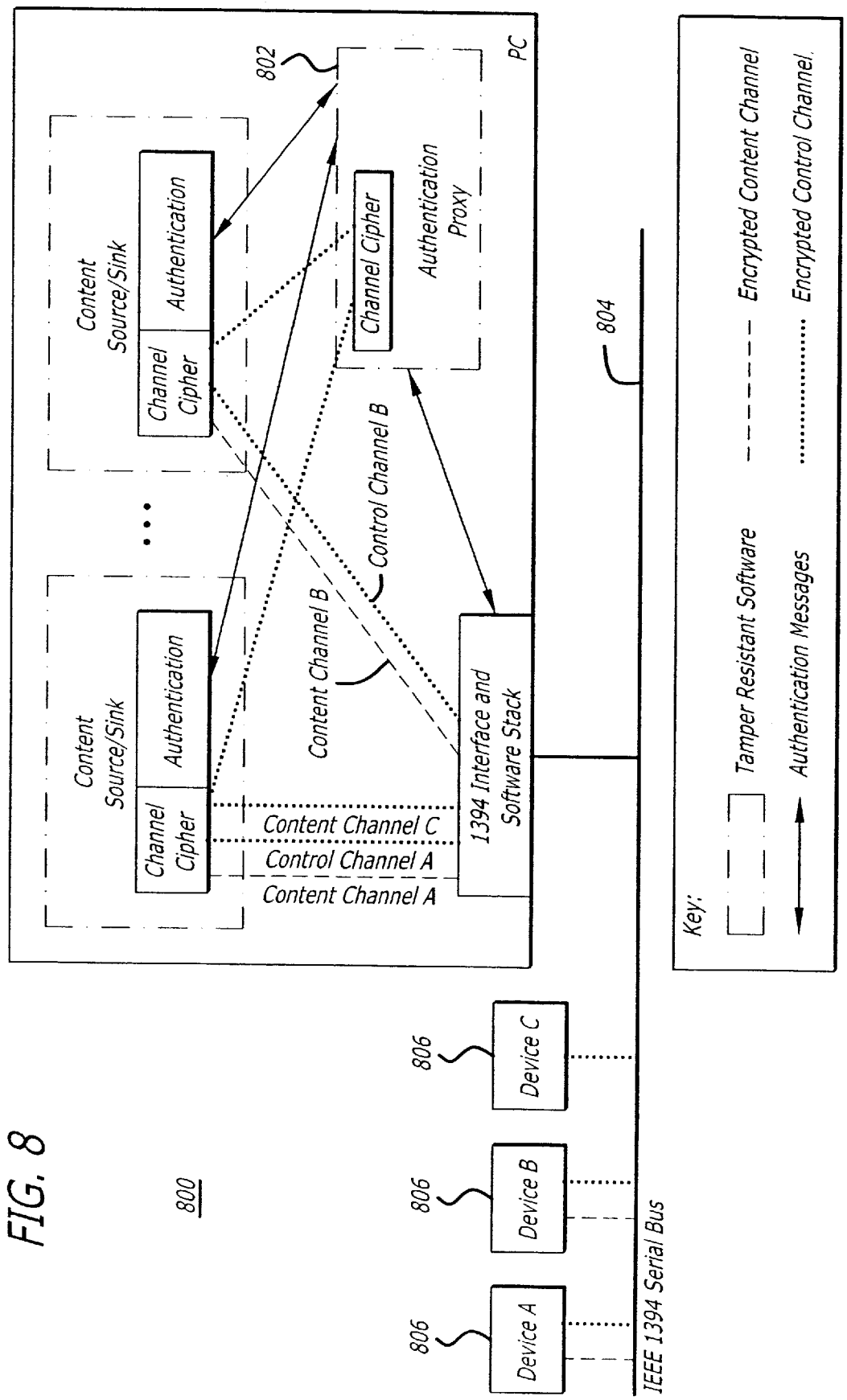
FIG. 8 is a block diagram showing an embodiment of the present invention implemented with a software authentication proxy.

An illustrative embodiment 800 implementing the present invention on a PC is shown in FIG. 8. A shared authentication proxy 802 on the PC handles all authentication activities associated with managing a protected content stream traversing a serial bus 804 between the PC and other IEEE 1394 devices 806. This includes not only authenticating external devices but also authenticating software components running on the PC which will source and sink protected content streams. The authentication mechanism used between the software components running on the PC and authentication proxy 802 is typically the same as the one described above in connection with hardware sources/sinks. Each software component which is a source or sink of content has a digital certificate and a public/private DSS key pair associated with it just like a physical device.

When a software source or sink is initialized, it performs a full authentication with authentication proxy 802. This results in the establishment of a secure control channel between the software component and the authentication proxy. External devices also authenticate themselves with the authentication proxy on the PC whenever they need to exchange content with the PC. The authentication proxy passes the control channel key established with an external device to the software components that handle the content being transmitted or received by that device via the control channel between the software component and the authentication proxy. The external device and the software component can then establish content channels using the control channel which is now open between them.

Alternative embodiments, including ones with no centralized authentication proxy, are possible. If there is no centralized authentication proxy, authentication can be performed directly between the software components sourcing or sinking the protected content and the external serial bus devices. Additional software functionality would be needed to ensure that authentication messages get routed correctly between an IEEE 1394 software stack and the source/sink software components being authenticated.

Conclusion

Embodiments of the present invention provide a flexible system which can support a range of protection levels. Digital certificates enable device authentication which in turn facilitates the exclusion of devices which can circumvent the protection of the content. Furthermore, the content itself may be encrypted to ensure that even if it is copied, it will be in an unusable format. The present invention allows for a high level of content protection which can be implemented with a reasonable level of resources for consumer electronics equipment and computer systems.

Embodiments of the present invention advantageously provide strong protection of audio/video content transmitted over communications links such as an IEEE 1394 bus.

A further advantage of the present invention is that non-compliant devices are unable to transmit or receive protected content.

A still further advantage of the present invention is that it is inexpensive to implement in PCs and other consumer electronic devices.

It will be understood by those skilled in the art that many design choices are possible within the scope of the present invention. The present invention is not limited to communication via a bit serial link, nor is it limited to a particular cryptographic algorithm or key length. For example, although an illustrative embodiment of the present invention is described as using an IEEE 1394 serial bus, the present invention is equally applicable to other interconnect technologies such as Ethernet, Asynchronous Transfer Mode (ATM), cable television systems, and telephony networks. Also, cryptographic algorithms chosen for the content and control channels may be different. Similarly, cryptographic algorithms chosen for authentication may be different from those described herein. For example, the RSA algorithm can be used for digital signatures and key exchange.

The present invention can be embodied as methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The program code encoded in tangible media creates the means for causing the computer to perform the various steps of the present invention. The present invention can also be embodied in the form of computer program code, whether stored in a storage medium loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code combines with the microprocessor to provide a unique device that operates analogously to specific circuits.

It will be understood that various changes in the details, materials, and arrangements of the parts and steps which have been described and illustrated in order to explain the nature of this invention may be made by those skilled in the art without departing from the principles and scope of the invention as expressed in the subjoined claims.

What is claimed is:

1. A method of transferring content from a content source to a content sink, comprising:
   a) exchanging random challenges between the content source and the content sink;
   b) encrypting the exchanged random challenges with a secret key, then hashing the encrypted random challenges;
   c) exchanging the encrypted, hashed random challenges;
   d) comparing exchanged encrypted, hashed random challenges to expected values;
   e) establishing, if the exchanged encrypted, hashed random challenges match the expected values, a preliminary control channel.
   f) establishing a preliminary content channel; and
   g) transferring content over the preliminary content channel.

2. The method of claim 1, further comprising:
   establishing a full control channel and a full content channel.

3. The method of claim 2, further comprising:
   transferring content over the full content channel.

4. The method of claim 1, further comprising:
   determining whether at least one of a content sink, and a content source is computationally constrained.

5. A method of transferring information, the method comprising:
   a) transmitting a first random challenge from a first device to a second device, and transmitting a second random challenge from the second device to the first device;
   b) in the first device, encrypting, then hashing the second random challenge, and in the second device, encrypting, then hashing the first random challenge;
   c) transmitting the hashed, encrypted, second random challenge to the second device, and transmitting the hashed, encrypted, first random challenge to the first device;
   d) in the first device, comparing the hashed, encrypted first random challenge to a first expected value, and in the second device comparing the hashed, encrypted second random challenge to a second expected value;
   e) if both comparisons in (d) result in a match, then establishing a preliminary content channel; and
   f) transferring information over the preliminary content channel.

6. The method of claim 5, further comprising terminating information transfer over the preliminary content channel.

7. The method of claim 5, further comprising establishing a full control channel and a full content channel.

8. A method of transferring information, the method comprising:
   a) transmitting a first random challenge from a first device to a second device, and transmitting a second random challenge from the second device to the first device;
   b) in the first device, encrypting, then hashing the second random challenge, and in the second device, encrypting, then hashing the first random challenge;
   c) transmitting the hashed, encrypted, second random challenge to the second device, and transmitting the hashed, encrypted, first random challenge to the first device;
   d) in the first device, comparing the hashed, encrypted first challenge to a first expected value, and in the second device comparing the hashed, encrypted second random challenge to a second expected value;
   e) if both comparisons in (d) result in a match, then generating a preliminary control channel key to establish a preliminary content channel, the generating of the preliminary control channel key comprises encrypting the first random challenge, encrypting the second random challenge and performing an exclusive OR operation on the encrypted first random challenge and the encrypted second random challenge; and
   f) transferring information over the preliminary content channel.

9. The method of claim 8, further comprising determining if the result of the exclusive OR operation is a zero, and if it is, then setting the preliminary control channel key equal to the encrypted first challenge.

10. The method of claim 8, wherein encrypting the first challenge comprises performing a baseline cipher operation with a secret key.

11. A method comprising:
   a) conducting a preliminary authentication phase to establish an encrypted control channel between a first device and a second device;
   b) temporarily transferring content over the encrypted control channel; and
   c) conducting a full authentication phase in a background while transferring the content over the encrypted control channel, the full authentication phase being more robust than the preliminary authentication phase.

12. The method of claim 11, wherein conducting the full authentication phase comprises:
   transferring a first message from the first device;
   receiving a second message by the first device, the second message including a message signature and a certificate;
   determining by the first device that the second message is valid;
   verifying by the first device that the certificate is valid; and
   calculating a key for maintaining the encrypted control channel.

13. The method of claim 12, further comprising:
selecting an channel encryption function to be used in connection with the encrypted control channel.
   a) a first program conde to conduct a preliminary authentication phase to establish an encrypted control channel between the computer and a remote device;
   b) a second program code to temporarily transfer content over the encrypted control channed from the computer; and
   c) a third program code to conduct a full authentication phase in a background while transferring the content over the encrypted control channel, the full authentication phase being more robust than the preliminary authentication phase.

14. The method of claim 11, wherein the coducting of the preliminary authentication phase includes encrytion and subsequent hashing of random challenges provided by the first device and the second device.

15. A method comprising:
   a) conducting a preliminary authentication phase to establish an encrypted control channel between a first device and a second device, the conducting of the preliminary authentication phase comprises (i) exchanging data between the first device and the second device, (ii) encrypting the exchanged data and subsequently hashing the encrypted data, (iii) exchanging the encryted, hashed data, (iv) comparing the exchanged encryted, hashed data to expected values, and (v) establishing the encryted control channel if the exchanged encryted, hashed data matches the expected values;
   b) temporarily transferring content over the encryted control channel; and
   c) conducting a full authentication phase in a background while transferring the content over the encryted control channel, the full authentication phase being more robust than the preliminary authentication phase.

16. The method of claim 15, wherein the exchanged data is encryted with a preliminary control channel key being a result of a shared secret key and a random challenge of the first device encryted with a cipher.

17. The method of claim 16, wherein the cipher is a Baseline Cipher.

18. The method of claim 15, wherein the exchanged data is encryted with a preliminary control channel key being a result of an Exclusive OR operation on (1) a shared secret key and a random challenge of the first device encryted with a cipher and (2) the shared secret key and a random challenge of the second device encryted with the cipher.

19. The method of claim 15, wherein the conducting of the full authentication phase occurs in the background while the content is being transferred over the encryted control channel.

20. A computer program code stored in a computer-readable storage medium for execution by a comupter, comprising:
   a) a first program code to conduct a preliminary authentication phase to establish an encryted control channedl between the computer and a remote device;
   b) a second program code to temporarily transfer content over the encryted control channel from the computer; and
   c) a third program code to conduct a full authentication phase in the background while transferring the content over the encryted controll channel, the full authentication phase being more robust than the preliminary authentication phase.

21. The computer program code of claim 20, wherein third program code to conduct the full authentication phase comprises:
   code to transfer a first message from the computer;
   code to receiving a secon message by the computer, the second message including a message signature and a certificate, and to determine that the second message is valid and the certificate is valid; and
   code to calculate a key for maintaing the encryted control channel.

22. The computer program code of claim 20, wherein the preliminary anthentication phase conducted by the first program code includes encryption and subsequent hashing operations on a first radom challenge by the first device and on a second random challenge by the second device and comparison of the hashed encrypted random challenges with expected values by both the first device and the second device.

23. A computer program code stored in a computer-readable storage medium for execution by a computer, comprising:
   a) a first program code to conduct a preliminary authentication phase to establish an encryted control channel between the computer and a remote device, the first program code comprises
   code to exchange data by the computer with the remote device,
   code to encrypt the exchanged data and subsequently hash the encrypted data,
   code to exchange the encrypted, hashed data with the remote device,
   code to compare the exchanged encrypted, hashed data to expected values, and
   code to establish the encrypted control channel if the exchanged encrypted, hashed data matches the expected values;
   b) a second program code to temporarily transfer content over the encrypted control channel from the computer; and
   c) a third program code to conduct a full authentication phase in a background while transferring the content over the encrypted control channel, the full authentication phase being more robust than the preliminary authentication phase.

24. The computer program code of claim 23, wherein the code to encrypt the exchanged data performs encryption using a preliminary control channel key being a result of a shared secret key and a random challenge of the computer encrypted with a cipher.

25. The computer program code of claim 23, wherein the code to encrypt the exchanged data performs encryption using a preliminary control channel key being a result of an Exclusive OR operation on (1) a shared secret key and a random challenge of the computer encrypted with a cipher and (2) the shared secret key and a random challenge of the remote device encrypted with the cipher.

26. The computer program of claim 23, wherein the full authentication phase is conducted by the second program code in the background while the content is being transferred over the encrypted control channel.

27. A device comprising:
   a) means for conducting a preliminary authentication phase to establish an encrypted control channel to a remote device;
   b) means for temporarily transferring content over the encrypted control channel; and c) means for conducting a full authentication phase in a background while transferring the content over the encrypted control channel, the full authentication phase being more robust than the preliminary authentication phase.

28. The device of claim 27, wherein the means for conducting the preliminary authentication phase further encrypts and performs subsequeng hashing operations of random challenges provided by the first device and the second device.

29. A device comprising:
a) means for conducting a preliminary authentication phase to establish an encrypted control channel to a remote device, including (i) means for exchanging data with the remote device, (ii) means for encrypting the exchanged data and subsequently hashing the encrypted data, (iii) means for comparing the exchanged encrypted, hashed data to expected values, and (iv) means for establishing the encrypted control channel if the exchanged encrypted, hashed data matches the expected values;
b) means for temporarily transferring content over the encrypted control channel; and
c) means for conducting a full authentication phase in a background while transferring the content over the encrypted control channel, the full authentication phase being more robust than the preliminary authentication phase.

30. The device of claim 29, wherein the exchanged data is encrypted with a preliminary control channel key being a result of a shared secret key and a random challenge of the first device encryptee with a cipher.

31. The device of claim 29, wherein the exchanged data encrypted with a preliminary control channel key being a result of an Exclusive OR operation on (1) a shared secret key and a random challenge of the device encrypted with a cipher and (2) the shared secret key and a random challenge of remote device encrypte with the cipher.

32. The device of claim 29, wherein the means for conducting the full authentication phase operates in the background while the content is being transferred over the encrypted control channel.

33. A method comprising:
a) conducting a preliminary authentication phase to produce an encrypted control channel between a first device and a second device;
b) transferring content over the encrypted control channel; and
c) conducting a full authentication phase in the background while transferring the content over the encrypted control channel, the full authentication phase being more robust than the preliminary authentication phase.

34. The method of claim 33, wherein the conducting of the preliminary authentication phase includes encryption and subsequent hashing of random challenges provided by the first device and the second device.

35. A method comprising:
a) conducting a preliminary authentication phase to produce an encrypted control channel between a first device and a second device by (1) exchanging data between the first device and the second device, (2) encrypting the exchanged data and subsuquently hashing the encrypted data, (3) exchanging the encrypted, hashed data, (4) comparing the exchanged encrypted, hashed data to expected values, and (5) producing the encrypted control channel if the exchanged encrypted, hashed data matches the expected values;
b) transferring content over the encrypted control channel; and
c) conducting a full authentication phase in the background while transferring the content over the encrypted control channel, the full authentication phase being more robust than the preliminary authentication phase.

36. The method of claim 35, wherein conducting the full authentication phase comprises:
transferring a first message from the first device;
receiving a second message by the first device, the second message including a message signature and a certificate
determining by the first device that the second message is valid;
verifying by the first device that the certificate is valid; and
calculating a key for maintaining the encrypted control channel.

37. The method of claim 35, wherein the exchanged data is encrypted with a preliminary control channel key being a result of an Exclusive OR (XOR) operation on (1) a shared secret key and a random challenge of the first device encrypted with a cipher and (2) the shared secret key and a random challenge to the second device encrypted with the cipher.

38. The method of claim 35, wherein the conducting of the full authentication phase operates in the background while the content is being transferred over the encrypted control channel.

39. The method of claim 35, wherein the data includes random challenges.

40. The method of claim 39, wherein the encrypted control channel is supported by a preliminary phase control key being a result produced by an Exclusive OR operation being conducted on an encrypted the random challenges provided by the first device and a second device.

* * * * *

UNITED STATES PATENT AND TRADEMARK OFFICE
CERTIFICATE OF CORRECTION

| | |
|---|---|
| PATENT NO. | : 6,542,610 B2 |
| APPLICATION NO. | : 08/909338 |
| DATED | : April 1, 2003 |
| INVENTOR(S) | : Traw et al. |

It is certified that error appears in the above-identified patent and that said Letters Patent is hereby corrected as shown below:

Column 15,
Lines 4-14, after "channel." delete
"a) a first program conde to conduct a preliminary authentication phase to establish an encrypted control channel between the computer and a remote device;
b) a second program code to temporarily transfer content over the encrypted control channel from the computer; and
c) a third program code to conduct a full authentication phase in a background while transferring the content over the encrypted control channel, the fill authenication phase being more robust than the prelimary authentication phase.".

Column 15,
Line 15, delete "coducting" and insert -- conducting --.
Line 16, delete "encrytion" and insert -- encryption --.
Line 57, delete "channed 1" and insert -- channel --.
Line 64, delete "the" and insert -- a --.
Line 65, delete "controll" and insert -- control --.

Column 16,
Line 5, delete "secon" and insert -- second --.
Line 14, delete "radom" and insert -- random --.

Column 17,
Line 8, delete "subsequeng" and insert -- subsequent --.
Line 32, delete "encryptee" and insert -- encrypted --.
Line 38, delete "encrypte" and insert -- encrypted --.

UNITED STATES PATENT AND TRADEMARK OFFICE
CERTIFICATE OF CORRECTION

PATENT NO. : 6,542,610 B2
APPLICATION NO. : 08/909338
DATED : April 1, 2003
INVENTOR(S) : Traw et al.

It is certified that error appears in the above-identified patent and that said Letters Patent is hereby corrected as shown below:

<u>Column 18,</u>
Line 27, after "certificate" insert -- ; --.

Signed and Sealed this

Fourth Day of July, 2006

JON W. DUDAS
*Director of the United States Patent and Trademark Office*